US008081177B2

(12) United States Patent
White et al.

(10) Patent No.: US 8,081,177 B2
(45) Date of Patent: Dec. 20, 2011

(54) CHIPLET DISPLAY WITH OPTICAL CONTROL

(75) Inventors: Christopher J. White, Avon, NY (US); John W. Hamer, Rochester, NY (US)

(73) Assignee: Global OLED Technology LLC, Herndon, VA (US)

( * ) Notice: Subject to any disclaimer, the term of this patent is extended or adjusted under 35 U.S.C. 154(b) by 344 days.

(21) Appl. No.: 12/549,416

(22) Filed: Aug. 28, 2009

(65) Prior Publication Data

US 2011/0050658 A1 Mar. 3, 2011

(51) Int. Cl.
*G06F 3/038* (2006.01)

(52) U.S. Cl. ............. 345/207; 345/205; 345/32; 345/84

(58) Field of Classification Search ........................ None
See application file for complete search history.

(56) References Cited

U.S. PATENT DOCUMENTS 4,769,292 A 9/1988 Tang et al.
5,061,569 A 10/1991 VanSlyke et al.
5,726,786 A 3/1998 Heflinger
6,141,465 A 10/2000 Bischel et al.
6,259,838 B1 7/2001 Singh et al.
6,384,529 B2 5/2002 Tang
7,034,775 B2 * 4/2006 Kitamura et al. .............. 345/2.1
7,190,849 B2 * 3/2007 Katase ............................ 345/90
2006/0055864 A1 3/2006 Matsumura et al.
2007/0057263 A1 3/2007 Kahen
2008/0008472 A1 1/2008 Dress et al.
2008/0150848 A1 6/2008 Chung et al.

FOREIGN PATENT DOCUMENTS

WO WO/02/47310 A2 6/2002

OTHER PUBLICATIONS

Yoon et al, A novel use of MEMs switches in driving AMOLED, Digest of Tech. Papers of the Society for Information Display, 2008 3.4, p. 13.

* cited by examiner

*Primary Examiner* — Muhammad N Edun
(74) *Attorney, Agent, or Firm* — Morgan, Lewis & Bockius LLP

(57) ABSTRACT

A display device having a display substrate defining an optical waveguide for transporting light carrying pixel information; a chiplet disposed over the display substrate, having a chiplet substrate separate from the display substrate, a photosensor responsive to light from the optical waveguide at the selected control wavelength for providing the pixel information, a selection circuit responsive to the pixel information for providing a control signal, and a drive circuit responsive to the control signal, wherein the chiplet is adapted to receive the transported light; an optical transmitter for transmitting the pixel information from the controller as light at the selected control wavelength into the optical waveguide, and a display optical element located in or over the display area responsive to the drive circuit for providing light.

20 Claims, 12 Drawing Sheets

CHIPLET DISPLAY WITH OPTICAL CONTROL

CROSS REFERENCE TO RELATED APPLICATION

Reference is made to commonly-assigned, co-pending U.S. patent application Ser. No. 12/480,804 filed Jun. 9, 2009, entitled "Display Device with Parallel Data Distribution" to Cok et al, the disclosure of which is incorporated herein.

FIELD OF THE INVENTION

The present invention relates to display devices having a substrate with distributed, independent chiplets employing parallel control for a pixel array.

BACKGROUND OF THE INVENTION

Flat-panel display devices are widely used in conjunction with computing devices, in portable devices, and for entertainment devices such as televisions. Such displays typically employ a plurality of pixels distributed over a substrate to display images. The substrate is typically a continuous sheet of glass, but can be plastic or other materials, and can be divided into multiple adjacent tiles. Each pixel incorporates several, differently colored light-emitting elements commonly referred to as sub-pixels, typically emitting red, green, and blue light, to represent each image element. As used herein, pixels and sub-pixels are not distinguished and refer to a single light-emitting element. A variety of flat-panel display technologies are known, for example plasma displays, liquid crystal displays, and electroluminescent (EL) displays, such as light-emitting diode (LED) displays.

EL displays incorporating thin films of light-emitting materials forming light-emitting elements have many advantages in a flat-panel display device and are useful in optical systems. U.S. Pat. No. 6,384,529 to Tang et al. shows an organic light-emitting diode (OLED) color display that includes an array of organic LED light-emitting elements. Alternatively, inorganic materials can be employed and can include phosphorescent crystals or quantum dots in a polycrystalline semiconductor matrix. Other thin films of organic or inorganic materials known in the art can also be employed to control charge injection, transport, or blocking to the light-emitting-thin-film materials. The materials are placed upon a substrate between electrodes, with an encapsulating cover layer or plate. Light is emitted from a pixel when current passes through the light-emitting material. The frequency of the emitted light is dependent on the nature of the material used. In such a display, light can be emitted through the substrate (a bottom emitter) or through the encapsulating cover (a top emitter), or both.

Control of sub-pixels is typically accomplished with row electrodes and orthogonal column electrodes, in an active- or passive-matrix configuration as known in the art. However, these configurations limit the timing flexibility of the display. Furthermore, in active-matrix displays, each subpixel includes one or more thin-film transistors (TFTs), and such transistors have undesirable nonuniformity (e.g. low-temperature polysilicon, LTPS, TFTs) or aging (e.g. amorphous silicon, a-Si, TFTs).

Employing an alternative control technique, Matsumura et al. describe crystalline silicon substrates used for driving LCD displays in U.S. Patent Application Publication No. 2006/0055864. The application describes a method for selectively transferring and affixing pixel-control devices ("chiplets") made from semiconductor substrates onto a separate planar display substrate. Wiring interconnections within the pixel-control device and connections from busses and control electrodes to the pixel-control device are shown. A matrix-addressing pixel control technique is taught.

The technique of Matsumura overcomes the TFT limitations of the prior art. However, in high-resolution or high-frame-rate displays, this technique is limited by the electrical properties of the row and column electrodes used to transmit pixel information, information controlling the subpixels, to the chiplets. These electrodes have crosstalk and resistive, inductive and capacitive delays that are very difficult to overcome.

In other fields, it is known to overcome limitations of electrical signaling using optical signaling. For example, U.S. Pat. No. 5,726,786 to Heflinger teaches a free-space optical interconnect (FSOI) in which transceivers send and receive information using light propagating through a transmission volume such as an integrating chamber. U.S. Patent Application Publication No. 2008/0008472 to Dress et al. teaches an optical broadcast interconnect using one lens per transmitter and one lens per receiver to permit a transmitter to efficiently transmit light simultaneously to many receivers. These two applications permit effective optical communication e.g. from a controller to many receivers, but only in a large optical volume. These schemes are not, therefore, suitable for flat-panel displays, which have significant constraints on space and particularly on thickness.

U.S. Pat. No. 6,141,465 to Bischel et al. teaches a display device using optical waveguides and poled electro-optical structures to direct light from the edge of a flat display out to a viewer. This scheme permits light to be transmitted through the substrate of a display and extracted at a desired point. However, the poled electro-optical structures are complex and require expensive manufacturing processes. Furthermore, this scheme is directed to a light output for pixels, a very different problem than control-signal distribution for chiplets.

U.S. Pat. No. 6,259,838 to Singh et al. teaches a display device employing a plurality of light-emitting elements disposed along the length of a light-emitting fiber, such as an optical fiber. This scheme provides optical control of OLED display elements. However, in high-resolution displays, this scheme requires precise positioning of a large number of fibers, e.g. one per row. Positioning errors can cause visible non-uniformity and reduce yields. Furthermore, any breaks in the fiber can deactivate all pixels after the break, or all pixels attached to that fiber.

There is a need, therefore, for improving the distribution of pixel control information to chiplets on a display device.

SUMMARY OF THE INVENTION

In accordance with the present invention, there is provided a display device responsive to a controller, comprising:

(a) a display substrate defining an optical waveguide for transporting light carrying pixel information and having a refractive index at a selected control wavelength, a long dimension, a display area, and an optical power attenuation along the long dimension of less than 20 dB at the selected control wavelength;

(b) a chiplet disposed over the display substrate, having a chiplet substrate separate from the display substrate, a photosensor responsive to light from the optical waveguide at the selected control wavelength for providing the pixel information, a selection circuit responsive to the pixel information for providing a control signal, and a drive circuit responsive to the control signal, wherein the chiplet is adapted to receive the transported light;

(c) an optical transmitter for transmitting the pixel information as light at the selected control wavelength into the optical waveguide, wherein the optical transmitter transmits light in response to pixel information provided by the controller, and wherein the transmitted light is transported by the optical waveguide to the photosensor; and (d) a display optical element located in or over the display area responsive to the drive circuit for providing light.

An advantage of the present invention is that the chiplets are reduced in size and cost compared to the prior art. This can provide reduced display thickness compared to the prior art. Use of the selection circuit responsive to the pixel information is a more efficient design that reduces complexity of the display device. Furthermore, a display device of the present invention is more tolerant of wiring and interconnection faults than the prior art, as there can be no signal wires to fail. A further advantage is that the cost of driver circuitry and display manufacturing can be reduced compared to the prior art, as the number of electrical drivers to be bonded to the panel is reduced.

The present invention provides an effective way of optically distributing pixel information to chiplets on a flat panel display to control subpixels attached to those chiplets. Optical distribution removes delays experienced by electrical communications methods, including transmission-line and RLC delays. Transmitting light through the display backplane removes the need for a separate waveguide, and does not objectionably increase the volume occupied by the display. Forming photosensors on the chiplets permits the use of high-density lithography to form effective receiver circuits on the chiplets. The present invention does not increase manufacturing cost of the substrate as do prior art methods of substrate light-piping. The present invention provides robust communications with chiplets, which can be interrupted only by breaking the substrate.

Figure 1A:
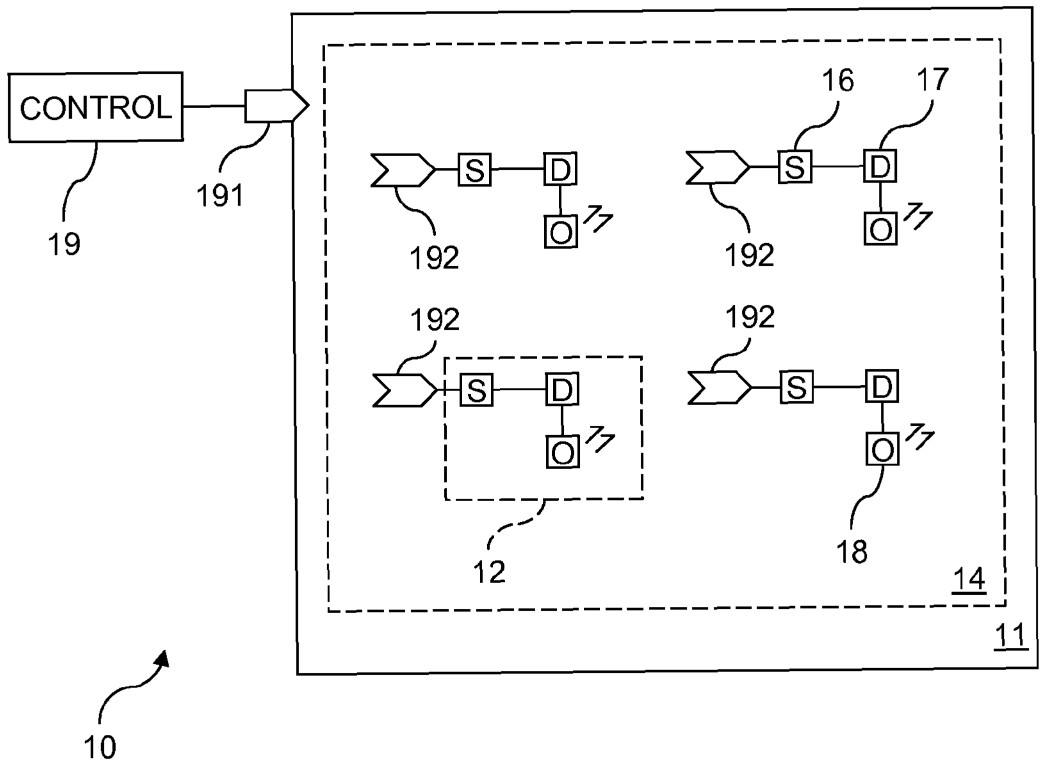
FIG. 1A is a block diagram of a display device according to an embodiment of the present invention.

Because the various layers and elements in the drawings have greatly different sizes, the drawings are not to scale.

DETAILED DESCRIPTION OF THE INVENTION

Referring to FIG. 1A, a display device 10 according to an embodiment of the present invention includes a display substrate 11 on which are formed a plurality of subpixels 12. Each subpixel 12 has a selection circuit 16 and a drive circuit 17. Each subpixel 12 also includes a display optical element 18, e.g. an electroluminescent (EL) emitter (light-emitting element). Each display optical element 18 is located in or over display area 14, and is responsive to the drive circuit for providing light. Connections within a subpixel 12 can be made electrically, optically, or by other ways known in the art. A controller 19 provides pixel information to each selection circuit 16 to determine how much light is provided by each subpixel 12.

The display substrate 11 defines an optical waveguide for transporting light carrying the pixel information. In this application, "light", when referring to pixel information, includes all electromagnetic radiation (commonly called "radio waves"), not just those in the visible region of the electromagnetic spectrum. Thus "light" includes radio (3 kHz-300 GHz), infrared, visible (approximately 400 THz-800 THz), ultraviolet, and other electromagnetic waves. "Optical" and "photo" likewise refer to any electromagnetic waves, so that, for example, an "optical transmitter" and a "photosensor" can operate anywhere in the electromagnetic spectrum, not just in the visible light region. An optical transmitter can be called an "electromagnetic-wave transmitter," and a photosensor can be called an "electromagnetic-wave sensor" or "electromagnetic-wave receiver."

The controller 19 sends the pixel information to an optical transmitter 191, indicated on this and other figures as a block arrow with a flat left-hand end. The pixel information is supplied to each subpixel by a photosensor 192, indicated throughout as a block arrow with an indented left-hand end. The optical transmitter 191 transmits the pixel information provided by the controller 19 optically as a pixel-information signal to the one or more photosensor(s) 192 through the optical waveguide defined by the display substrate 11. The pixel-information signal is transmitted as light at a selected control wavelength, e.g. 875 nm, used by the IrDA standard. The light from the optical transmitter 191 travels through the display substrate 11 and passes by every photosensor 192, although not necessarily all at the same time. Photosensor 192 can be a photodiode or phototransistor, or other optical sensor types known in the art.

Photosensor 192 responds to the pixel-information signal, the light coming from the optical transmitter 191 through the optical waveguide of the display substrate 11 at the selected control wavelength, to provide the pixel information to the selection circuit 16. The selection circuit 16 responds to the pixel information to provide a control signal to the drive circuit 17, as will be discussed further below. Drive circuit 17 responds to the control signal by causing display optical element 18 to produce or provide light corresponding to the pixel information. Display optical element 18 can provide light at one or more emission wavelength(s) equal or not equal to the selected control wavelength.

Figure 1B:
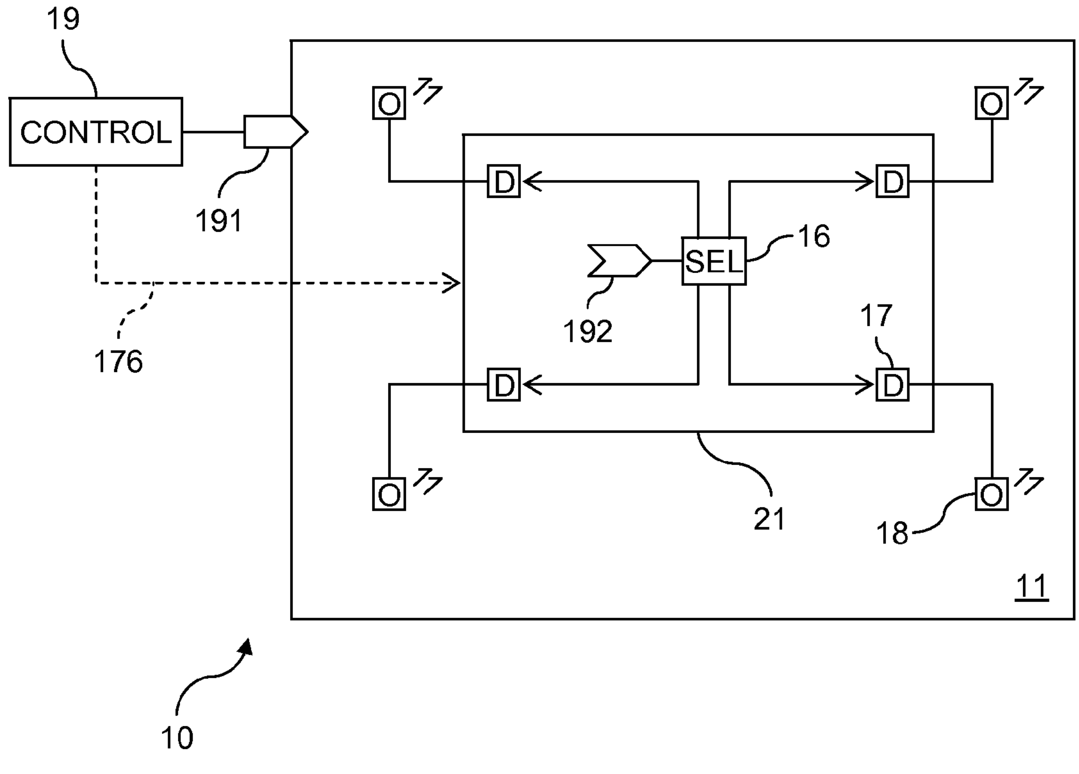
FIG. 1B is a block diagram of an embodiment of a display device according to the present invention.

Referring to FIG. 1B, in one embodiment, display device 10 having display substrate 11, one or more display optical element(s) 18, controller 19, and optical transmitter 191 as on FIG. 1A, further includes a chiplet 21 disposed over the display substrate 11 for controlling one or more of the subpixel(s) 12. The chiplet 21 includes photosensor 192 and selection circuit 16 for receiving the pixel information from the controller 19. The chiplet 21 also includes drive circuit 17 corresponding to each display optical element 18. Although subpixels 12 are not completely independent in this embodiment as in the embodiment of FIG. 1A, all of the components of a subpixel 12 are present and perform analogous functions. Note that the receiver and selection circuit can be combined or partitioned in various ways that will be obvious to those skilled in the electronics art.

Figure 1C:
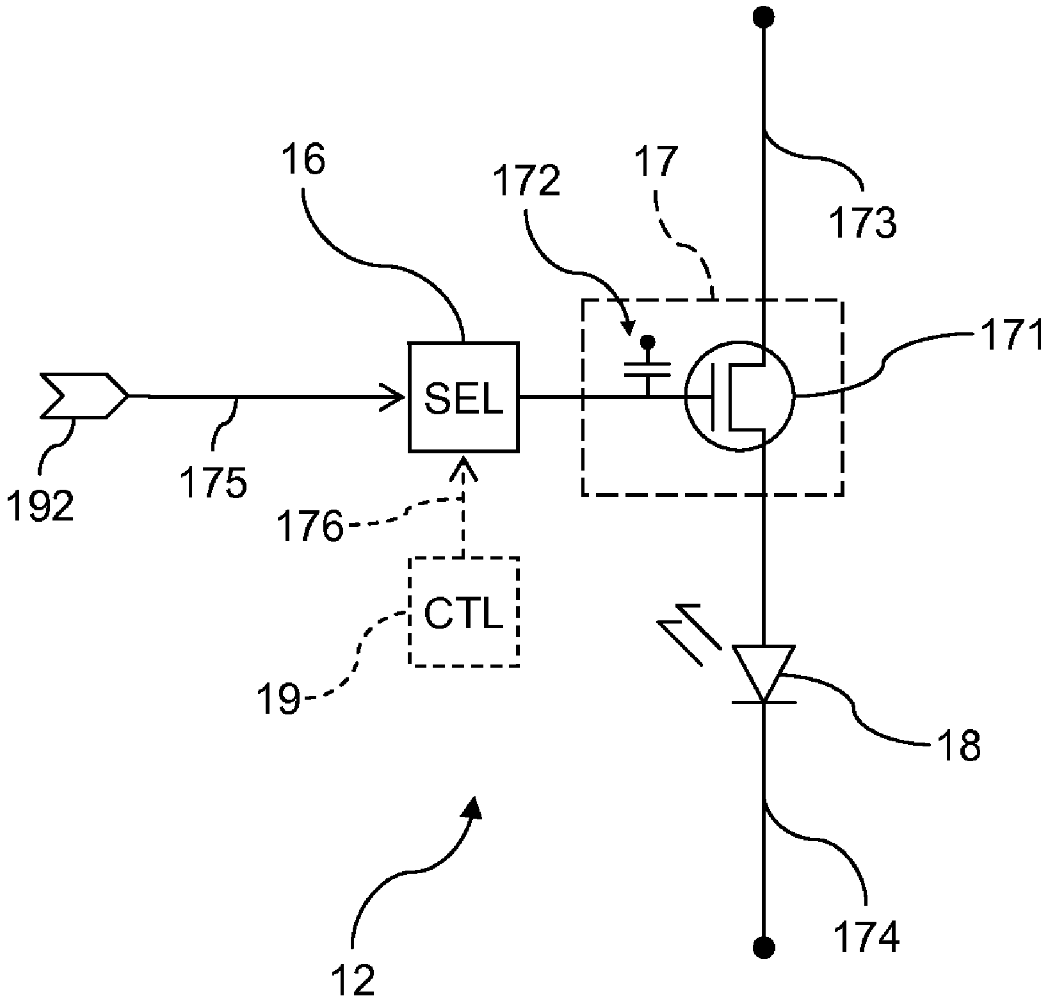
FIG. 1C is a schematic of an electroluminescent (EL) subpixel useful with the present invention.

FIG. 1C shows an electroluminescent (EL) subpixel useful with the present invention. As described above, subpixel 12 has the selection circuit 16 and the drive circuit 17. Each subpixel 12 includes a display optical element 18, which is an EL emitter, e.g. an organic light-emitting diode (OLED). Display optical element 18 can further include a color filter. Drive circuit 17 includes a drive transistor 171 that operates as a voltage-to-current converter, and includes an optional storage capacitor 172 for storing a voltage applied to the gate of drive transistor 171. Selection circuit 16 supplies to drive circuit 17 a control signal, which is a voltage, corresponding to the desired light output from the display optical element 18. The control signal is optionally stored on storage capacitor 172. The control signal is applied to the gate of drive transistor 171 and causes drive transistor 171 to pass current corresponding to the applied gate voltage. That current flows through OLED display optical element 18, which emits a corresponding amount of light.

Selection circuit 16 receives pixel information from photosensor 192 over connection 175, which can be an electrical connection. Selection circuit 16 or drive circuit 17 can include other electrical connections as known in the art. Drive transistor 171 is connected to a first power supply line 173 to receive current from a power supply (not shown). Display optical element 18 is connected to a second power supply line 174 to send the current back to the power supply to complete the circuit. Similarly, selection circuit 16 can be electrically connected to controller 19 as known in the art through electrical connection 176 (e.g. through source and gate lines), in addition to being connected to photosensor 192.

Referring back to FIG. 1B, in chiplet embodiments, chiplet 21 can be electrically connected to controller 19 through electrical connection 176. This electrical connection 176 is in addition to the optical connection through optical transmitter 191 and photosensor 192, not instead of the optical connection. The controller 19 provides supplemental pixel information to selection circuit 16 through electrical connection 176, and the selection circuit 16 is further responsive to the supplemental pixel information to provide the control signal. In one embodiment, display optical elements 18 are driven with digital drive as known in the art. The pixel information is a clock signal provided optically to all chiplets, preferably having a frequency greater than 10 MHz (e.g. 60 Hz×720 rows×8-bit time-division digital drive=11.06 MHz). The supplemental pixel information is a digital value for each display optical element 18 controlled by chiplet 21 indicating the duty cycle with which that display optical element 18 should be driven. The pixel information signal advantageously transmits the clock optically, without the skew and noise associated with electrical distribution of high-speed clocks across display devices 10, and the supplemental pixel information advantageously distributes per-chiplet or per-subpixel information without requiring a high information density of the pixel information signal. In one embodiment, the display is used to form 3D images, for example multi-viewer-position autostereoscopic images. In this embodiment, the clock signal can have a frequency of at least 50 MHz, permitting the display device 10 to operate at frame rates of at least 300 Hz.

The control signal can be a current, pulse train, or other signal type known in the art. The display optical element 18 can be a light-controlling element, such as a liquid crystal light modulator. Light-controlling elements can include crossed polarizers surrounding a liquid crystal for restricting the passage of light from a backlight in accordance with a voltage provided to the light-controlling element by the pixel-driving circuit.

Figure 2A:
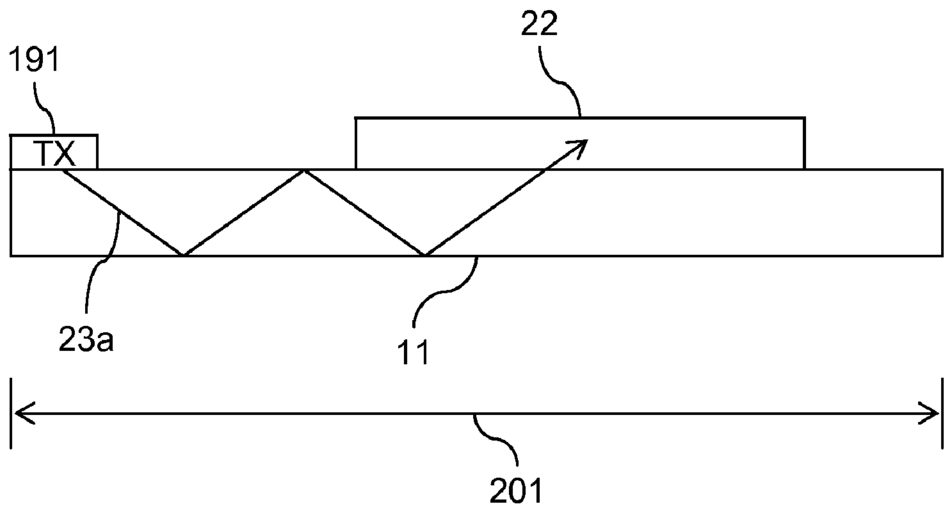
FIG. 2A is a cross-section of a display substrate and chiplet according to an embodiment of the present invention.

Referring to FIG. 2A, chiplet 21 has a chiplet substrate 22 separate from display substrate 11. The chiplet substrate 22 can preferably have a thickness of less than 20 um. The chiplet 21 is adapted to receive the pixel-information signal, the light transported through the optical waveguide, as indicated by light path 23*a* from optical transmitter 191. Light can pass out of the display substrate 11 and into the chiplet substrate 22 as will be described further below. The display substrate 11 has a long dimension 201. In this example, the light of the pixel-information signal travels in light path 23*a* along long dimension 201. As light travels light path 23*a*, it is attenuated as known in the art. Attenuation is measured in dB of optical power attenuation in a particular direction, per unit length. For example, typical optical fiber used for communications has an optical power attenuation of 3 dB/km at 850 nm.

According to the present invention, the display substrate 11 has an optical power attenuation along the length of display substrate 11 in the long dimension 201 of less than 20 dB at the selected control wavelength. That is, at least 1% of the optical power injected at one end of the display substrate 11 at the selected control wavelength will reach the other end of the display substrate 11 when travelling along the long dimension 201. From this point on, the term "along" in reference to an axis or dimension of a component of the present invention (e.g. display substrate 11, chiplet substrate 22) will be understood by those skilled in the art to mean in the direction of the axis or dimension, for a length up to the length of the corresponding component. For example, "along the long axis of display substrate 11" refers to travel in the direction of long dimension 201 for the length of display substrate 11 in that direction, and no farther.

An optical waveguide as known in the art is generally a material with a higher refractive index than the material adjacent to it, in which light is transported by total internal reflection. Display substrate 11 has a refractive index at the selected control wavelength that is higher than the air surrounding it, and thus forms an optical waveguide. For example, a glass display substrate typically has a refractive index of 1.5, and air typically has a refractive index of 1.0. Display substrate 11, forming an optical waveguide, has a critical angle with respect to the normal of display substrate 11. When light path 23*a* encounters the top surface 11*a* of display substrate 11 at an angle above (farther from the normal than) this critical angle, it is reflected back into the display substrate 11. Therefore, light rays having angles of incidence that are above the critical angle of the top surface 11*a* of the display substrate 11 will be trapped in the display substrate 11. As shown in FIG. 2A, to extract these light rays into chiplet substrate 22, the chiplet substrate 22 can have a refractive index approximately equal to the refractive index of display substrate 11 and be placed directly in contact with display substrate 11, permitting light to pass from display substrate 11 directly into chiplet substrate 22 with little refraction. Note that the term "top surface" does not require any particular orientation of the display substrate 11.

Figure 2B:
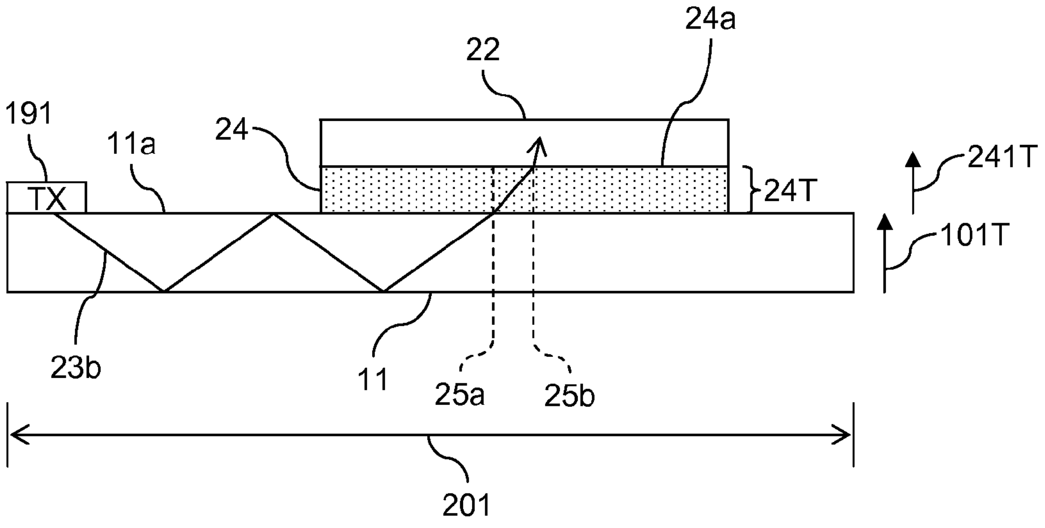
FIG. 2B is a cross-section of a display substrate and chiplet according to an embodiment of the present invention.

Referring to FIG. 2B, in another embodiment, the chiplet substrate 22 is adhered to the display substrate 11 using an adhesive 24 disposed between the display substrate and the chiplet substrate 22. The adhesive 24 can be an epoxy (e.g. RTV, room-temperature vulcanization), a photoresist (e.g. Rohm & Haas MEGAPOSIT SPR 955-CM general purpose photoresist), or another adhesive known in the art. The adhesive 24 can be disposed evenly over the whole of display substrate 11 or, as shown here, be disposed only between its corresponding chiplet substrate 22 and the display substrate 11.

The adhesive 24 has a thickness 24T defined by a thickness axis 241T. By a quantity being "defined by" an axis, e.g. a thickness 24T being defined by a thickness axis 241T, it is meant that the quantity (e.g. thickness 24T) is measured along the axis (e.g. the thickness axis 241T). The axis is generally that along which the quantity is smallest. For example, the distance between the floor and ceiling of a room is measured vertically, not diagonally (which would give larger measurements than vertical), so the height of the room is defined by a vertical axis.

The thickness is preferably greater than or equal to one micron and less than or equal to 10 microns. The thickness axis 241T is substantially parallel to a thickness axis 101T defining the thickness of the display substrate 10. By "substantially parallel," it is meant that the angle between thickness axis 241T and thickness axis 101T is ±10 degrees.

To permit light to travel through the adhesive 24 to the chiplet substrate 22, the adhesive 24 has an optical power attenuation along the thickness axis 241 T of the adhesive 24 of less than 10 dB at the selected control wavelength. In an embodiment of the present invention, the adhesive 24 can function as an optical filter, e.g. a color filter, to discriminate between light at the selected control wavelength and other light. For example, the adhesive 24 can be a color filter formed from a photoresist as described above with a pigment (e.g. Clariant PY74 or BASF Palitol(R) Yellow L 0962 HD PY138 for yellow-transmitting pigments useful in green color filters, or a Toppan pigment) mixed in, or a colored photoresist (e.g. Fuji-Hunt Color Mosaic CBV blue color resist). The adhesive 24 can further have an optical power attenuation along the thickness axis 241T of the adhesive 24 of greater than or equal to 10 dB at a selected wavelength different from the selected control wavelength. For example, the adhesive 24 can pass infrared light while blocking visible light.

The chiplet substrate 22 has a refractive index at the selected control wavelength. For example, bulk silicon at room temperature has a refractive index at 1000 um of approximately 3.5. The adhesive 24 also has a refractive index at the selected control wavelength. For example, Intertronics DYMAX OP-4-20658 fiber-optic UV-curable cationic epoxy adhesive has a refractive index of 1.585 in infrared wavelengths. The chiplet substrate 22 can preferably have a refractive index at the selected control wavelength greater than the refractive index of the display substrate 11 at the selected control wavelength. This causes light rays to bend towards the normal when passing from the display substrate 11 to the chiplet substrate 22 rather than away from it, increasing the probability that any given light ray will strike the photosensor 192. The adhesive 24 can preferably have a refractive index at the selected control wavelength greater than 80% of the refractive index of the display substrate 11 at the selected control wavelength and less than 120% of the refractive index of the chiplet substrate 22 at the selected control wavelength. This minimizes light loss from total internal reflection in the display substrate 11. The adhesive 24 can more preferably have a refractive index at the selected control wavelength greater than or equal to the refractive index of the display substrate 11 at the selected control wavelength and less than or equal to the refractive index of the chiplet substrate 22 at the selected control wavelength, and even more preferably have a refractive index at the selected control wavelength greater than the refractive index of the display substrate 11 at the selected control wavelength and less than the refractive index of the chiplet substrate 22 at the selected control wavelength. This last provides a light path 23*b* in which a light ray is bent towards normal 25*a* when it passes from display substrate 11 into adhesive 24 at top surface 11*a* of display substrate 11, and more towards normal 25*b* when it passes from adhesive 24 into chiplet substrate 22 at top surface 24*a* of adhesive 24. Note that normals 25*a* and 25*b* are parallel when top surface 24*a* is flat, but this is not required.

FIGS. 2A and 2B show light paths 23*a* and 23*b* along long dimension 201. However, light can travel through display substrate 11 in many paths, such as straight lines in any direction or spherical wavefronts.

Figure 2C:
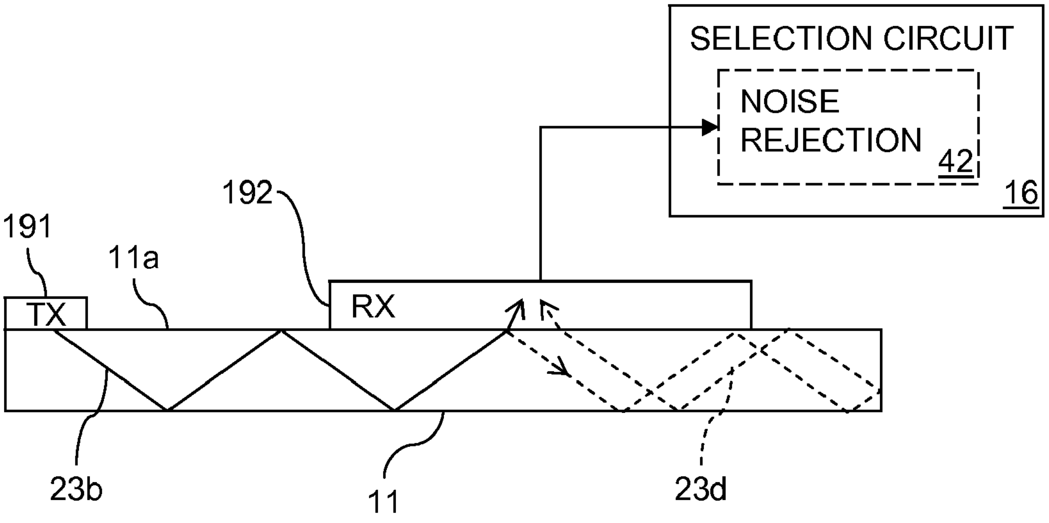
FIG. 2C is a cross-section of a display substrate and chiplet according to an embodiment of the present invention.
Figure 2D:
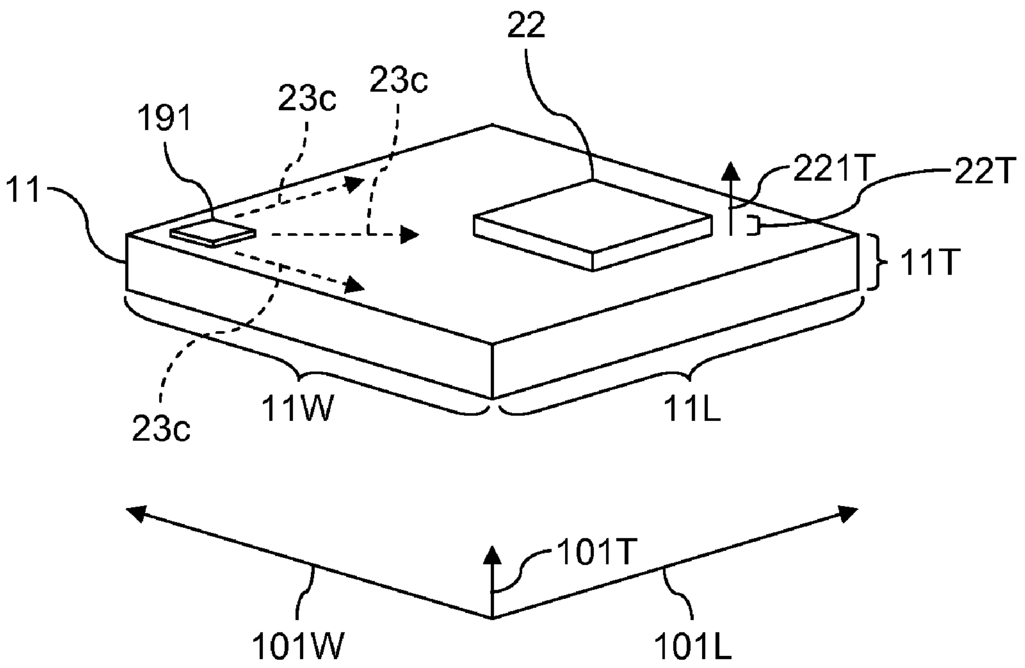
FIG. 2D is an isometric view of a substrate and chiplet according to an embodiment of the present invention.

Referring to FIG. 2D, display substrate 11 and chiplet substrate 22 are shown in an isomorphic view. The display substrate 11 has length 11L, width 11W, and thickness 11T. These dimensions are defined respectively by three substantially orthogonal axes: length axis 101L, width axis 101W, and thickness axis 101T. By "substantially orthogonal," it is meant that the axes have angles between them of 90±10 degrees. The long dimension 201 of the display substrate 11 can be measured as the longer of the length 11L and the width 11W. Alternatively, the long dimension can be measured along a diagonal in the length-width (101L-101W) plane of the display substrate. The thickness 11T is less than the smaller of length 11L and width 11W, and is preferably less than or equal to 20 mm. For example, length 11L and width 11W can have a ratio of 16:9 and values of greater than 10", and thickness 11T can be less than or equal to 2 mm.

The chiplet substrate 22 has a thickness 22T, which can be less than 20 um. The thickness 22T is defined by thickness axis 221T, which is substantially parallel to the thickness axis 101T of display substrate 22. The angle between thickness axis 221T and the plane containing length axis 101L and width axis 101W can be within ±10 degrees of the angle between thickness axis 101T and the plane containing length axis 101L and width axis 101W. That is, defining $p_n$ as the vector cross product of length axis 101L and width axis 101W, a vector perpendicular to both axes, the angle between thickness axis 221T and $p_n$ is within ±10 degrees of the angle between thickness axis 101T and $p_n$.

To permit light to travel through the chiplet substrate 22 to a photosensor disposed thereupon, the chiplet substrate 22 has an optical power attenuation along the thickness axis 221T of the chiplet substrate 22 of less than 20 dB at the selected control wavelength.

The pixel-information signal transmitted by the optical transmitter 191 travels in the optical waveguide in one or more directions substantially parallel to thickness axis 101T of the display substrate 11, as shown by light paths 23*c*. When the pixel-information signal reaches the area under the chiplet substrate 22 it is extracted from the optical waveguide as described above and received by the photosensor 192. The pixel-information signal reaches each chiplet 21, but chiplets 21 can receive the pixel-information signal at different times or by different paths. Light does not need to pass through the entire area of the display substrate 11. The optical transmitter 191 can be a narrow-beam source, such as a laser or laser diode, a broad-beam source, such as a lamp or isotropic emitter, or in between, such as an LED. The optical transmitter 191 can be constructed on the substrate (e.g. an electroluminescent emitter), mounted on the substrate (e.g. a surface-mount LED), attached to the substrate (e.g. a discrete LED held adjacent to the substrate mechanically), near the substrate (e.g. a laser with its beam directed into the substrate), or other options obvious to those skilled in the art. The optical transmitter 191 can be positioned on or near a top surface, bottom surface, or edge of the display substrate 11.

As known in the art, the thickness T (m) of a rectangular waveguide is related to the frequency $f$ (Hz) the waveguide typically carries by Equation 1:

$$f = kc/T \quad \text{(Eq. 1)}$$

where k is a dimensionless constant ranging between approximately 0.3 and 0.5 and c is the speed of light (~$3\times10^8$ m/s). There is a range of k values because a waveguide of a particular thickness can carry a band of frequencies. Using a typical value for k of 0.4, the visible light range (approximately 380 to 750 nm, or approximately 400 to 800 THz) can preferably be carried in waveguides of 1500 to 3000 angstroms thick. Layers of this thickness can be deposited by conventional equipment; for example, a conventional sputtered metal layer is 2000 angstroms thick. Such waveguides can therefore be transparent waveguiding display substrate layers on supports 32, as described above. To make light at the selected control wavelength invisible to the user, eye-safe infrared wavelengths of approximately 1.5 um can preferably be used with display substrates 11 of approximately 6000 angstroms thick, or 2 um with approximately 8000 angstroms thick.

Alternatively, conventional glass display substrates 11 can be used as waveguides for light in the microwave frequency range. Glass display substrates 11 can be between 0.3 mm and 2 mm, inclusive, and preferably between 0.5 mm and 1 mm, inclusive. 2 mm glass can preferably carry frequencies between approximately 50 and 70 GHz, including the ISM (Industrial, Scientific, Medical) unlicensed band at 61.25 GHz and, in the United States, the unlicensed band from 59-64 GHz. 1.1 mm glass can preferably carry frequencies between 85 and 130 GHz, which includes the ISM band at 122.5 GHz. 0.5 mm glass can preferably carry frequencies between 190 and 280 GHz, including the ISM band at 245 GHz. 0.3 mm glass can preferably carry light in the sub-millimeter range of approximately 315 to 470 GHz (approximately 650 to 950 um), which is unlicensed in most jurisdictions as it is above 300 GHz.

The optical waveguide defined by the display substrate 11 can carry light of higher frequencies than the preferable range. For example, the Earth's surface and ionosphere bound a waveguide, having the atmosphere as a dielectric, for very low frequencies (e.g. Schumann resonances below 40 Hz), but radio waves of much higher frequencies (e.g. 30 KHz to 3 PHz) also propagate in the atmosphere. Similarly, glass display substrates 11 can carry frequencies above their preferable ranges listed above (e.g. 280 GHz for 0.5 mm glass), including e.g. visible-light frequencies of approximately 400 to 800 THz. At frequencies higher than the preferable range of the display substrate 11, light is not completely contained within the waveguide, and some light escapes. The present invention requires only that enough of the light of the pixel-information signal reach the photosensor 192 to permit the photosensor 192 to provide the control information to the selection circuit. Photosensors as known in the art have a detection threshold, so light reaching the photosensor at the selected control wavelength can preferably have an amplitude greater than the detection threshold.

As the display substrate 11 can carry light at more than one wavelength, pixel information can be transmitted on more than one wavelength in parallel (wavelength-division multiplexing, "WDM"). Referring back to FIG. 1B, controller 19 can provide pixel information and second pixel information. Optical transmitter 191 can transmit two wavelengths simultaneously, or include two transmitters transmitting on different wavelengths. The two wavelengths are the selected control wavelength and a second selected control wavelength. The pixel information is transmitted at the selected control wavelength, and the second pixel information is simultaneously transmitted at the second selected control wavelength. The display substrate 11 is adapted to transport the light carrying the second pixel information at the second selected control wavelength, and has an optical power attenuation along long dimension 201 of less than 20 dB at the second selected control wavelength. Chiplet 21 is adapted to receive the transported light at the second selected control wavelength. Photosensor 192 can have a selective frequency response so that it can receive light at both wavelengths, or include two receivers on the two wavelengths.

Figure 1D:
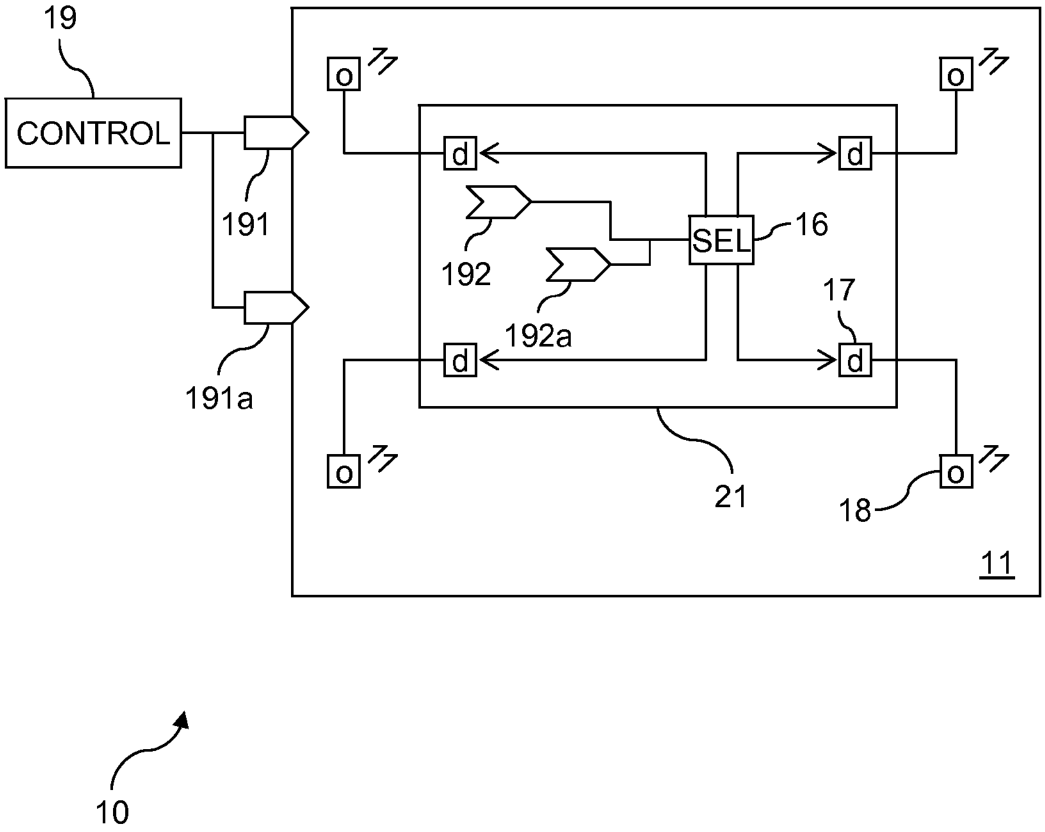
FIG. 1D is a block diagram of an embodiment of a display device according to the present invention.

Referring to FIG. 1D, in another embodiment, the pixel information is divided into, and transmitted as, a first pixel-information signal at the selected control wavelength and a second pixel-information signal at a second selected control wavelength. As on FIG. 1B, display device 10 includes display substrate 11, one or more display optical element(s) 18, controller 19, optical transmitter 191, and chiplet 21 having photosensor 192, selection circuit 16, and drive circuit 17. Controller 19 is also connected to a second optical transmitter 191*a* for transmitting the second-pixel information signal as light at the second selected control wavelength into the optical waveguide while optical transmitter 191 transmits the first pixel-information signal. Chiplet 21 is adapted to receive the transported light at the second selected control wavelength. Photosensor 192 can respond to the first and the second pixel-information signals, or a second photosensor 192*a* can be included which responds to the second pixel-information signal (the light transported by the optical waveguide at the second selected control wavelength) while photosensor 192 responds to the first pixel-information signal. The selection circuit 16 responds to the first pixel information, carried in the first pixel-information signal, and to the second pixel information, carried in the second pixel-information signal, to provide the respective control signal to each drive circuit 17. In this embodiment, display substrate 11 is adapted to transport light carrying pixel information at the second selected control wavelength and has an optical power attenuation along the long dimension of less than 20 dB at the second selected control wavelength.

Figure 3:
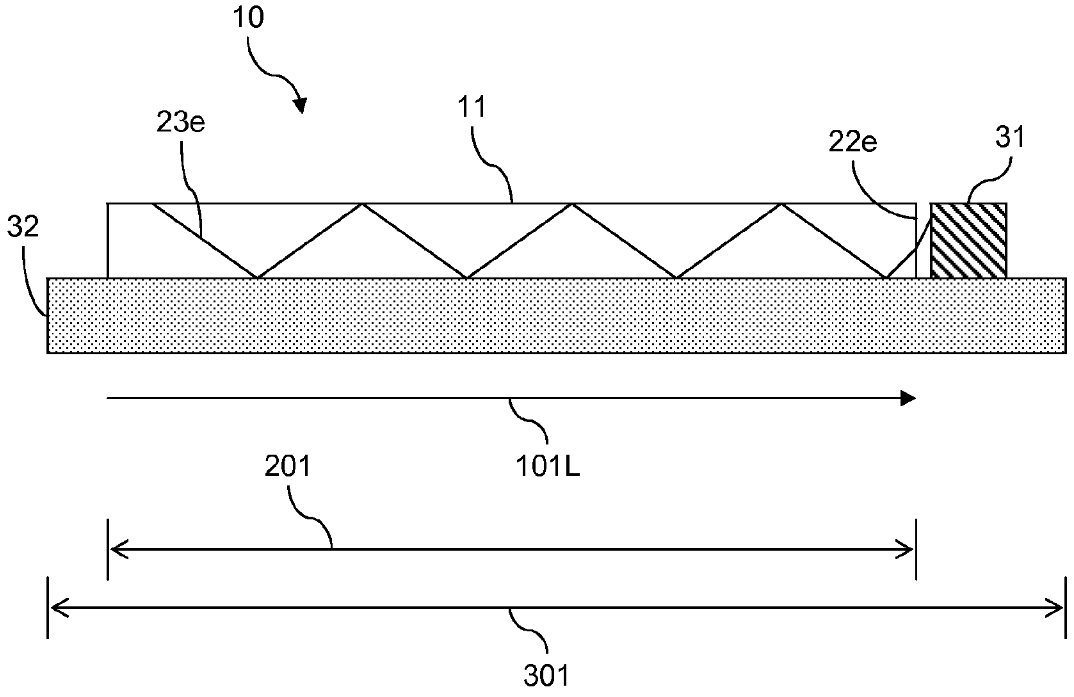
FIG. 3 is a cross-section of a substrate and support according to an embodiment of the present invention.

Referring to FIG. 3, when light travelling through display substrate 11 along light path 23*d* hits an edge 22*e* of the display substrate 11, it can be refracted out of the display substrate 11. Edge 22*e* is substantially perpendicular to length axis 101L (shown here) or width axis 101W (FIG. 2D). By "substantially perpendicular," it is meant that a vector in the plane of edge 22*e* forms an angle to length axis 101L of 90±10 degrees. If the selected control wavelength is a visible-light wavelength (e.g. between 380 nm and 750 nm), light coming out of the display substrate 11 can be objectionably visible to the user. To reduce this problem, in one embodiment, display device 10 includes an absorbing element 31 located adjacent and substantially parallel to the edge. The absorbing element 31 can be any material that will absorb light at the selected control wavelength, e.g. a bar of black plastic with a matte finish. The absorbing element 31 has an absorption percentage greater than zero at the selected control wavelength, and preferably an absorption percentage greater than 75% at the selected control wavelength. The higher the absorption percentage, the less light will be visible to the user. The absorbing element 31 can be directly in contact with display substrate 11, or near but separated from it by air, an adhesive, or another separator known in the art.

In one embodiment, the display substrate 11 is mounted on a support 32. For example, a transparent glass display substrate 11 can be mounted on an opaque plastic support 32 to add mechanical stability. Alternatively, the display substrate 11 can be a transparent waveguiding display substrate layer deposited on a foil support by spin-coating or other thin-film deposition methods. The support can preferably reflect light at the selected control wavelength, or have a refractive index less than the refractive index of the display substrate 11, to reduce light loss at the interface between the display substrate 22 and the support 32. Support 32 has a long dimension 301, which can be parallel to long dimension 201 of display substrate 11. The optical power attenuation of the support 32 at the selected control wavelength along the long dimension 301 is greater than the optical power attenuation along the long dimension 201 of the display substrate 11 at the selected control wavelength. Note that although the absorbing element 31 and the support 32 are shown on the same figure, the two can be used independently or in combination. The absorbing element 31 can be disposed over the support 32, but does not have to be. In embodiments including a support 32, the display substrate 11 can be non-rectangular. For example, display substrate 11 can be a patterned layer forming an optical waveguide as described above. Display substrate 11 is fully connected, so there is a path through display substrate 11 for light from the optical transmitter 191 to reach every photosensor 192 disposed in optical contact with display substrate 11, e.g. in optical contact with top surface 11*a*.

Modulation schemes, as known in the art, have a noise floor, or minimum acceptable signal-to-noise (S/N) ratio, at which an incoming signal can be received correctly. For a selected modulation scheme, light reaching the photosensor at the selected control wavelength can come from the optical transmitter through the optical waveguide of the display substrate, from other light sources through the optical waveguide, or from other light sources through media other than the optical waveguide (e.g. the air around the display). Light reaching the photosensor at the selected control wavelength other than light from the optical transmitter (the pixel-information signal) is noise.

Figure 4A:
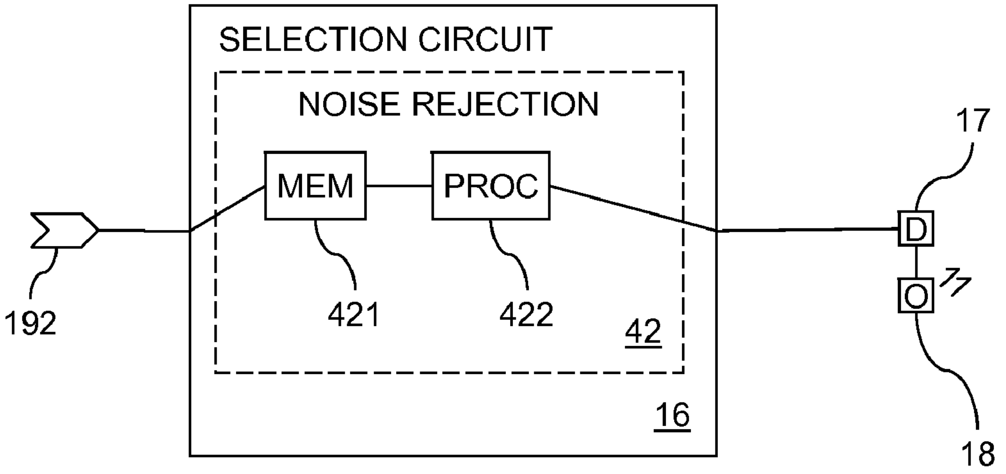
FIG. 4A is a schematic of a noise-rejection circuit and associated components according to an embodiment of the present invention.

Referring to FIG. 4A, selection circuit 16 can include a noise-rejection circuit 42 responsive to the control signal from the photosensor 192 for providing the pixel information to the drive circuit 17. In one embodiment, light from display optical element 18 is noise to photosensor 192. Noise-rejection circuit 42 thus includes a memory 421 for storing one or more received control signal(s) and a processor 422 responsive to the stored control signal(s) for adjusting the received control signal(s) to compensate for light emitted by the display optical element 18 at the selected control wavelength. The light emitted by display optical element 18 is known, as it corresponds to the stored control signal(s), so that light can be subtracted from the light received by photosensor 192 to reduce noise.

Figure 4B:
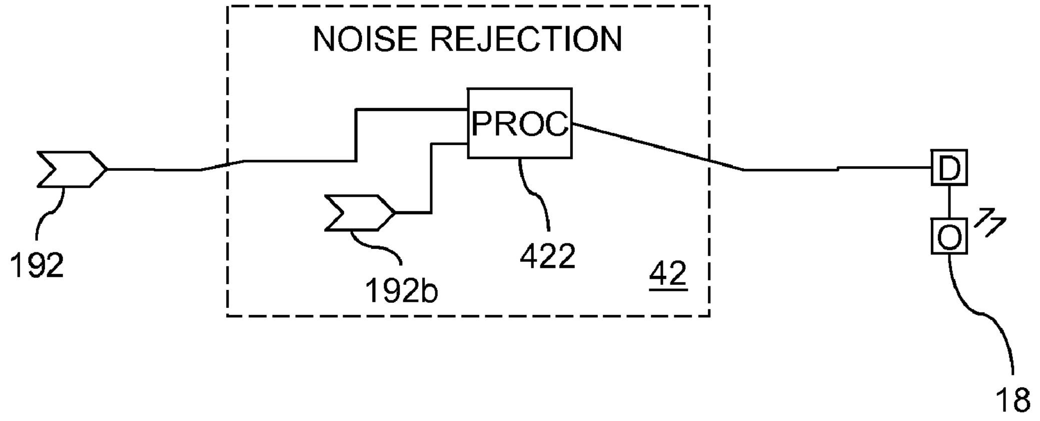
FIG. 4B is a schematic of a noise-rejection circuit and associated components according to an embodiment of the present invention.

Referring to FIG. 4B, in another embodiment in which light from display optical element 18 is noise to photosensor 192, the display optical element 18 is an electroluminescent emitter. Noise-rejection circuit 42 includes a second photosensor 192*b* for detecting light emitted by the EL emitter (display optical element 18) at a selected non-control wavelength not equal to the selected control wavelength. Processor 422 adjusts the received control signal(s) from photosensor 192 based on a signal from photosensor 192*b* to compensate for light emitted by the OLED EL emitter at the selected control wavelength to reduce noise. Broadband EL emitters as known in the art generally produce light at more than one wavelength, and the amount of light at each wavelength is correlated (e.g. fixed ratios). Therefore, measuring the light output of the EL emitter at the non-control wavelength, and using a measured or known correlation between light at the non-control wavelength and the control wavelength, the amount of light at the control wavelength can be determined, and that amount subtracted from the light received by photosensor 192 to reduce noise.

Figure 4C:
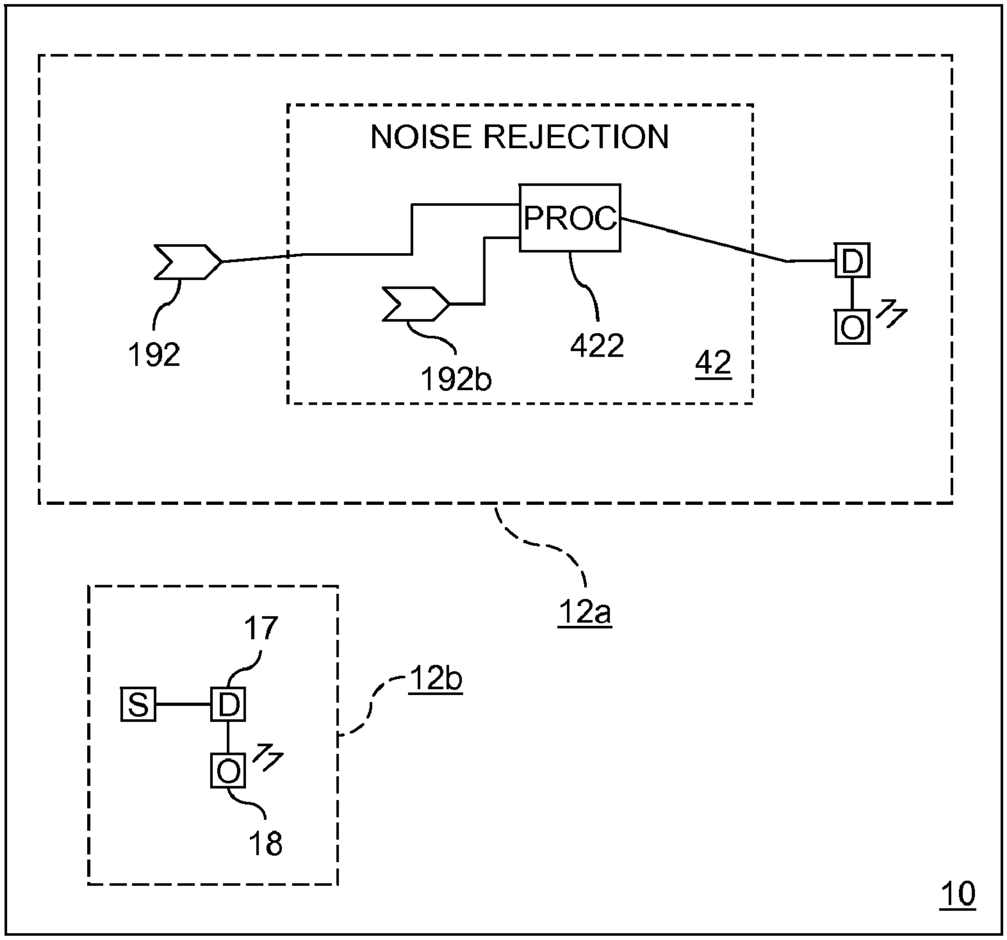
FIG. 4C is a schematic of a noise-rejection circuit and associated components according to an embodiment of the present invention.

Referring to FIG. 4C, in another embodiment, light from a second subpixel 12*b* in a display device 10 is noise to photosensor 192 in subpixel 12*a*. Subpixel 12*b* includes drive circuit 17 and display optical element 18, as described above. Noise-rejection circuit 42 in subpixel 12*a* includes a second photosensor 192*b* for detecting light emitted by display optical element 18 in subpixel 12*b*. Processor 422 adjusts the received control signal(s) from photosensor 192 based on a signal from photosensor 192*b* to compensate for light emitted by display optical element 18 in subpixel 12*b* at the selected control wavelength to reduce noise. Photosensor 192*b* can be optically shielded so it receives light only from display optical element 18 in subpixel 12*b*.

Referring to FIG. 2C, the pixel-information signal can bounce in display substrate 11 and be received by a single photosensor 192 multiple times. Photosensor 192 is disposed (e.g. on a chiplet substrate 22 as described above) over display substrate 11 having top surface 11*a*. Light path 23*b* shows light from optical transmitter 191 travelling through display substrate 11 and striking photosensor 192. Light can be both reflected and refracted at top surface 11*a*. Light path 23*d* shows reflected light travelling further through display substrate 11 and returning to photosensor 192. Light from path 23*d* reaches photosensor 192 later than light from path 23*b*. Therefore, photosensor 192 receives the same pixel information twice (an "echo"). Selection circuit 16 thus includes noise-rejection circuit 42, e.g. an echo-cancellation unit, to reduce errors due to echoes. For example, the pixel information can be is formatted in a plurality of packets for transmission, and each packet can include a timestamp, serial number, or other unique identifier which permits the packet to be discarded the second time it is received by a photosensor 192. Referring back to FIG. 4A, memory 421 can store the unique identifier(s) of one or more received packet(s) of pixel information, and provide to processor 422 only those packets which have not been received (i.e. whose unique identifier(s) have not been stored). A noise-rejection circuit 42 can include memory 421 and processor 422. Other echo-cancellation techniques known in the art can be employed with the present invention.

The pixel information is carried in a pixel-information signal, which can be modulated according to various techniques known in the art such as trellis modulation, non-return to zero (NRZ) on-off keying (OOK), intensity modulation (IM), or sub-carrier multiplexing (SCM), can be compressed using techniques known in the art such as Huffman coding or DCT, or can be encoded using techniques known in the art such as Manchester encoding or 8b10b encoding. Packets of pixel information can be combined or divided as necessary to transport them robustly through the display substrate 11, as known in the optical-communications and internetworking art.

Referring to FIG. 1A, the pixel-information signal travels to all of the subpixels 12. However, only a different subset of the information is needed by each drive circuit 17. Each selection circuit 16 thus selects only the pixel information relevant to the drive circuit(s) 17 connected to that selection circuit 16. Unlike the prior art, selection circuit 16 responds to the pixel-information signal to select the portion of pixel information relevant to its corresponding subpixel 12. A variety of methods can be employed to distribute the information to the subpixels 12 (or chiplets 21 of FIG. 1B), and to permit selection circuits 16 to select the relevant pixel information.

In one embodiment of the present invention, the pixel information (and thus the pixel-information signal) is divided by the controller 19 in a plurality of packets. The packets are arranged in a temporally sequential fashion and transmitted to the subpixels 12 or chiplets 21. From this point on, the term "recipient" will be understood by those skilled in the art to include a chiplet in embodiments when a chiplet 21 drives multiple subpixels 12, as shown on FIG. 1B, or a subpixel 12 in embodiments such as that shown on FIG. 1A.

Each recipient has a unique count value, for example a set of switches or pad connections specifying a binary value. Each selection circuit 16 includes a counter that counts the received packets of pixel information until the pixel information associated with a particular recipient is received, i.e. until the $i^{th}$ packet of pixel information is received, for a recipient having count value i. When the associated packet of pixel information is received, it is stored by the recipient, for example in digital storage elements such as flip flops or memories, or in analog storage elements such as capacitors (e.g. 172). The count value for a subpixel 12 can represent the number of the subpixel 12 in a rasterized order of subpixels 12 on the display, such as left-to-right, top-to-bottom. When multiple subpixels 12 are controlled by a single chiplet 21, each chiplet 21 can preferably have a unique count value, and each packet of pixel information can include pixel information for each of the subpixels 12 controlled by the corresponding chiplet.

In an alternative embodiment of the present invention, the pixel information is formatted in packets, each including a respective address value. Address values will be discussed further below. Each of a plurality of subpixels 12 or chiplets 21 has a corresponding address. From this point on, the term "destination address" refers to the address value of a packet, and will be understood by those skilled in the art to include a packet address value corresponding to a chiplet in embodiments when a chiplet 21 drives multiple subpixels 12, as shown on FIG. 1B, in addition to the packet address value corresponding to an individual subpixel 12 in embodiments such as that shown on FIG. 1A.

Specifically, the selection circuits 16 in each of the plurality of recipients (subpixels 12 or chiplets 21) has a respective address value. Each selection circuit 16 includes a matching circuit (e.g. a comparator) that compares the destination address of each packet received with the recipient's respective address value. When the matching circuit indicates the destination address matches the recipient's address value, the pixel information in the packet having the matching destination address is stored or provided to the corresponding drive circuit 17 as a control signal.

In various embodiments of the present invention, a variety of drive circuits 17 can be employed, for example constant-current or constant-voltage, and active- or passive-matrix. A variety of technologies, for example chiplets or thin-film silicon circuits, can be used to construct the selection circuits 16 and drive circuits 17.

In embodiments using an OLED as the display optical element 18, either a top-emitter or a bottom-emitter architecture can be employed. A top-emitter architecture can preferably be employed to improve the aperture ratio of the device and provide additional space over the display substrate 11 to route power and any other busses.

Address values for chiplets 21 can be selected arbitrarily, e.g. according to the 128-bit globally unique ID (GUID) standard known in the computer science art. Each subpixel 12 (or chiplet 21) can have a unique address value, that is, an address different from the addresses of all other subpixels 12. When multiple subpixels 12 are controlled by a single chiplet 21, each chiplet 21 can preferably have a unique address, and each packet of pixel information can include pixel information for each of the subpixels 12 implemented within the chiplet 21 having an address corresponding to the address of the packet. That is, each packet can have a corresponding address identifying a particular chiplet.

Address values can be assigned to chiplets by laser trimming or connection-pad strapping, as is known in the electronics art. Address values can also be assigned to chiplets by adjusting the mask for a silicon wafer of chiplets to provide a unique, wafer-coded address for each chiplet on the wafer. When using wafer-coded addresses, the same set of addresses can be used for each wafer.

According to one embodiment of the present invention, to make display device 10 using chiplets 21, the following steps are performed. One or more wafer(s) of chiplets, each chiplet having a unique address, and a display substrate 11 are prepared as described above. A plurality of chiplets 21 is selected from the wafer(s). A unique substrate location is then selected for each selected chiplet 21. The address and substrate location of each chiplet 21 are recorded. The chiplets 21 are adhered to the display substrate 11 at the corresponding substrate locations. The recorded addresses and substrate locations are then stored in a non-volatile memory, which can be a Flash memory, EEPROM, magnetic disk or other storage medium as known in the art. The non-volatile memory is then associated with the display substrate 11. For example, when the non-volatile memory is an EEPROM stored in a memory chiplet, the memory chiplet is adhered to the display substrate 11 and wired to the controller 19. When the non-volatile memory is a magnetic disk, the disk is marked with a unique code corresponding to the display substrate 11.

When the display device 10 is in use, the controller 19 reads the stored addresses and substrate locations of the chiplets 21. The controller 19 divides a received image signal into packets of pixel information corresponding to the substrate locations, one packet per substrate location, and therefore one packet per chiplet 21. The controller 19 assigns to each packet the chiplet address corresponding to the substrate location of the packet. This permits each chiplet 21 to retrieve the corresponding pixel information, as described above.

Each chiplet 21 has a substrate that is independent and separate from the display substrate 11. As used herein, "distributed over" the display substrate 11 means that the chiplets 21 are not located solely around the periphery of the display area 14 but are located within the array of subpixels, that is, beneath, above, or between subpixels 12 in the display area 14, preferably on the same side of the display substrate 11 as the display area 14.

In operation, a display controller 19 receives and processes an image signal according to the needs of the display device 10 to produce pixel information. The controller 19 then transmits the pixel information and optionally additional control signals optically to each chiplet 21 in the device. The pixel information includes luminance information for each display optical element 18, which can be represented in volts, amps, or other measures correlated with pixel luminance. The selection circuits 16 and drive circuits 17 then control the display optical elements 18 in the subpixels 12 to cause them to provide light according to the associated data value. The pixel-information signal can include timing signals (e.g. clocks), data signals, select signals, or other signals.

In one embodiment, the pixel information is divided into packets, each having a selected number of bits n of binary information. The pixel-information signal for each packet is the Manchester encoding of that packet according to the IEEE 802.3 Ethernet standards (a 0 bit is a 1-to-0 transition; a 1 bit is a 0-to-1 transition), modulated by on-off keying, with a pulse of light representing a 1 bit in the Manchester-encoded data, and the absence of a pulse of light representing a 0 bit. Each packet of pixel information has an address or count, a timestamp, and luminance information as described above.

For example, in a 1920×1280 RGBW quad-pattern display in which each chiplet controls four pixels (16 subpixels) with eight-bit luminance resolution, there are 518,400 chiplets on the display. Each chiplet is assigned a count (0 to 518,399) in raster order, left-to-right, then top-to-bottom when the display is in its normal viewing orientation. This count is represented as a 19-bit binary integer. A one-bit timestamp is used, and toggles value each frame. The timestamp permits chiplets to discard any packet received with the same timestamp bit as the previous packet received, since each chiplet is only intended to receive one packet per frame. The subpixels attached to the chiplet are numbered (x,y), where x is the column 0.3 and y is the row 0.3. Luminance information is arranged in a packet of pixel information in raster order left-to-right followed by top-to-bottom (increasing x, then increasing y).

Each packet of pixel information is formatted according to Table 1 (below), with bits numbered from 0, the first bit transmitted, to n−1 for an n-bit packet (here n=148), and with integers being transmitted most-significant-byte and most-significant-bit first (network byte order).

TABLE 1

Pixel-information packet layout

| Bit(s) | Function |
|---|---|
| 0 | Timestamp. 0 for the first frame; toggles each frame thereafter (1 for frame 1, 0 for frame 2, . . . ). |
| 1 . . . 19 | Count. 0 for the upper-left-hand chiplet, 1 for the first row, second column, . . . , 518, 399 ($1111110100011111111_2$) for the lower-right-hand chiplet |
| 20 . . . 27 | Luminance data for subpixel (0, 0) |
| 28 . . . 35 | Luminance data for subpixel (1, 0) |
| . . . | . . . |
| 140 . . . 147 | Luminance data for subpixel (3, 3) |

Packets of pixel information are transmitted one after the other. A packet with a count of all 1 bits (524,287) and all 16 luminance data values set equal to $55_{16}$ (010101012) is transmitted at the beginning of each frame to permit chiplets to detect the start of a frame and synchronize with the transmitted bit stream so the selection circuits can determine which transmitted bit is bit 0 of each packet. Once synchronized, the selection circuits count received bits modulo 148 (=n) to determine which bit of the pixel-information packet is being received. Each selection circuit provides to its corresponding drive circuit control signals corresponding to the sixteen luminance data values in each packet received having a count equal to the count corresponding to the selection circuit, and having a timestamp equal to the logical NOT of the timestamp of the previously-received packet.

The controller 19 can be implemented as a chiplet 21 and affixed to the display substrate 11. The controller 19 can be located on the periphery of the display substrate 11, or can be external to the display substrate 11 and include a conventional integrated circuit.

According to various embodiments of the present invention, the chiplets 21 can be constructed in a variety of ways, for example with one or two rows of connection pads along a long dimension of a chiplet 21.

The present invention is particularly useful for multi-subpixel device embodiments employing a large device substrate, e.g. glass, plastic, or foil, with a plurality of chiplets 21 arranged in a regular arrangement over the device substrate 11. Each chiplet 21 can control a plurality of subpixels 12 formed over the device substrate 10 according to the circuitry in the chiplet 21 and in response to control signals. Individual subpixel groups or multiple subpixel groups can be located on tiled elements, which can be assembled to form the entire display.

According to the present invention, chiplets 21 provide distributed subpixels 12 over a display substrate 11. A chiplet 21 is a relatively small integrated circuit compared to the display substrate 11 and includes wires, connection pads, passive components such as resistors or capacitors, or active components such as transistors or diodes, formed on an independent substrate. Chiplets 21 are made separately from the display substrate 11 and then applied to the display substrate 11. The chiplets 21 are preferably made using silicon or silicon on insulator (SOI) wafers using known processes for fabricating semiconductor devices. Each chiplet 21 is then separated prior to attachment to the display substrate 11. The crystalline base of each chiplet 21 can therefore be considered a substrate separate from the display substrate 11 and over which the one or more selection circuit(s) 16 or drive circuit (s) 17 are disposed. The plurality of chiplets 21 therefore has a corresponding plurality of substrates separate from the display substrate 11 and each other. In particular, the independent substrates are separate from the display substrate 11 on which the subpixels 12 are formed, and the areas of the independent chiplet substrates 22, taken together, are smaller than the display substrate 11. Chiplets 21 can have a crystalline substrate to provide higher performance, and smaller active components, than are found in, for example, thin-film amorphous- or polycrystalline-silicon devices. According to one embodiment of the present invention, chiplets 21 formed on crystalline silicon substrates are arranged in a geometric array and adhered to display substrate 11 with adhesion or planarization materials. Connection pads on the surface of the chiplets 21 are employed to connect each chiplet 21 to signal wires, power busses and row or column electrodes to drive display optical elements 18. Chiplets 21 can control at least four display optical elements 18. Chiplets 21 can have a thickness preferably of 100 um or less, and more preferably 20 um or less. This facilitates formation of the adhesive and planarization material over the chiplet 21 using conventional spin-coating techniques.

Since the chiplets 21 are formed in a semiconductor substrate, the circuitry of the chiplet 21 can be formed using modern lithography tools. With such tools, feature sizes of 0.5 microns or less are readily available. For example, modern semiconductor fabrication lines can achieve line widths of 90 nm or 45 nm and can be employed in making the chiplets 21 of the present invention. The chiplet 21, however, also requires connection pads for making electrical connection to the wiring layer provided over the chiplets 21 once assembled onto the display substrate 11. The connection pads are sized based on the feature size of the lithography tools used on the display substrate 11 (for example 5 um) and the alignment of the chiplets 21 to the wiring layer (for example ±5 um). Therefore, the connection pads can be, for example, 15 um wide with 5 um spaces between the pads. Therefore, the pads will generally be significantly larger than the transistor circuitry formed in the chiplet 21. The connection pads can be formed in a metallization layer on the chiplet 21 over the circuitry on the chiplet 21. It is desirable to make the chiplet 21 with as small a surface area as possible to enable a low manufacturing cost.

A useful chiplet can also be formed using micro-electro-mechanical (MEMS) structures, for example as described in "A novel use of MEMs switches in driving AMOLED", by Yoon, Lee, Yang, and Jang, Digest of Technical Papers of the Society for Information Display, 2008, 3.4, p. 13.

The display substrate 11 can include glass, and wiring layers made of evaporated or sputtered metal or metal alloys, e.g. aluminum or silver, formed over a planarization layer (e.g. resin) patterned with photolithographic techniques known in the art.

The present invention can be practiced with LED devices, either organic or inorganic. In a preferred embodiment, the present invention is employed in a flat-panel OLED device composed of small-molecule or polymeric OLEDs as disclosed in, but not limited to U.S. Pat. No. 4,769,292 to Tang et al., and U.S. Pat. No. 5,061,569 to Van Slyke et al. Inorganic devices, for example, employing quantum dots formed in a polycrystalline semiconductor matrix (for example, as taught in US Publication No. 2007/0057263 by Kahen), and employing organic or inorganic charge-control layers, or hybrid organic/inorganic devices can be employed. Many combinations and variations of organic or inorganic light-emitting materials and structures can be used to fabricate such a device, including either a top- or a bottom-emitter architecture, and either an inverted or non-inverted drive configuration.

The invention has been described in detail with particular reference to certain preferred embodiments thereof, but it will be understood that variations and modifications can be effected within the spirit and scope of the invention.

PARTS LIST

10 display device
11 display substrate
11*a* top surface
11L length
11T thickness
11W width
12 subpixel
12*a* subpixel
12*b* subpixel
14 display area
16 selection circuit
17 drive circuit
18 display optical element
19 controller
21 chiplet
22 chiplet substrate
22*e* edge
22T thickness
23*a* light path
23*b* light path
23*c* light path
23*d* light path
23*e* light path
24 adhesive
24*a* top surface
24T thickness
25*a* normal
25*b* normal
31 absorbing element
32 support
42 noise-rejection circuit
101L length axis
101T thickness axis
101W width axis
171 drive transistor
172 storage capacitor
173 power supply line
174 power supply line
175 connection
176 electrical connection
191 optical transmitter
191*a* optical transmitter
192 photosensor
192*a* photosensor
192*b* photosensor
201 long dimension
221T thickness axis
241T thickness axis
301 long dimension
421 memory
422 processor

The invention claimed is:

1. A display device responsive to a controller, comprising:

(a) a display substrate defining an optical waveguide for transporting light carrying pixel information and having a refractive index at a selected control wavelength, a long dimension, a display area, and an optical power attenuation along the long dimension of less than 20 dB at the selected control wavelength;

(b) a chiplet disposed over the display substrate, having a chiplet substrate separate from the display substrate, a photosensor responsive to light from the optical waveguide at the selected control wavelength for providing the pixel information, a selection circuit responsive to the pixel information for providing a control signal, and a drive circuit responsive to the control signal, wherein the chiplet is adapted to receive the transported light;

(c) an optical transmitter for transmitting the pixel information as light at the selected control wavelength into the optical waveguide, wherein the optical transmitter transmits light in response to pixel information provided by the controller, and wherein the transmitted light is transported by the optical waveguide to the photosensor; and (d) a display optical element located in or over the display area responsive to the drive circuit for providing light.

2. The display device of claim 1, wherein the chiplet is electrically connected to the controller, the controller further provides supplemental pixel information, and the selection circuit is further responsive to the supplemental pixel information to provide the control signal.

3. The display device of claim 1, wherein the controller is adapted to provide pixel information divided into packets, each packet having a corresponding address identifying a particular chiplet, and further including a second chiplet, wherein the selection circuit in each chiplet has a respective address, the addresses are different, and each selection circuit responds to the packet of pixel information having a corresponding address matching the address of the selection circuit to provide the corresponding control signal to the corresponding drive circuit.

4. The display device of claim 1, wherein the selection circuit further includes a noise-rejection circuit responsive to the control signal for providing the pixel information to the drive circuit.

5. The display device of claim 4, wherein the noise-rejection circuit further includes means for storing one or more received control signal(s) and is further responsive to the stored control signal(s), and further includes means for compensating for light emitted by the display optical element at the selected control wavelength to reduce noise.

6. The display device of claim 4, wherein the display optical element is an electroluminescent (EL) emitter, and wherein the noise-rejection circuit further includes a second photosensor for detecting light emitted by the EL emitter at a wavelength not equal to the selected control wavelength, and means for compensating for light emitted by the EL emitter at the selected control wavelength to reduce noise.

7. The display device of claim 4, further including a second drive circuit and a second display optical element responsive to the second drive circuit for displaying light, wherein the noise-rejection circuit further includes a third photosensor for detecting light displayed by the second display optical element, and means for compensating for light emitted by the second display optical element at the selected control wavelength to reduce noise.

8. The display device of claim 1, wherein the chiplet substrate has a thickness of less than 20 um.

9. The display device of claim 1, wherein the display substrate has a length, a width and a thickness defined by three substantially orthogonal axes, the long dimension is either the length or the width, and the thickness is less than the smaller of the length and the width.

10. The display device of claim 9, wherein the chiplet substrate has a thickness defined by a thickness axis, the thickness axis is substantially parallel to the thickness axis of the display substrate, and the chiplet substrate has an optical power attenuation along the thickness axis of the chiplet substrate of less than 20 dB at the selected control wavelength.

11. The display device of claim 9, wherein the transmitted light travels in one or more directions substantially perpendicular to the axis defining the thickness of the substrate.

12. The display device of claim 9, wherein the display substrate has an edge substantially perpendicular to the length axis or the width axis, and further including an absorbing element located adjacent and substantially parallel to the edge, wherein the absorbing element has an absorption percentage greater than zero at the selected control wavelength.

13. The display device of claim 1, further including a support on which the display substrate is mounted, the support having a long dimension and an optical power attenuation at the selected control wavelength along the long dimension greater than the optical power attenuation along the long dimension of the display substrate at the selected control wavelength.

14. The display device of claim 1, further including adhesive disposed between the display substrate and the chiplet for adhering the chiplet substrate to the display substrate, wherein the chiplet substrate has a refractive index at the selected control wavelength greater than the refractive index of the display substrate at the selected control wavelength, and wherein the adhesive has a refractive index at the selected control wavelength greater than 80% of the refractive index of the display substrate at the selected control wavelength and less than 120% of the refractive index of the chiplet substrate at the selected control wavelength.

15. The display device of claim 14, wherein the adhesive is a photoresist, has a thickness defined by a thickness axis which is substantially parallel to the axis defining the thickness of the display substrate, and has an optical power attenuation along the thickness axis of the adhesive of less than 10 dB at the selected control wavelength.

16. The display device of claim 15, wherein the adhesive is an optical filter having an optical power attenuation along the thickness axis of the adhesive of greater than or equal to 10 dB at a selected wavelength different from the selected control wavelength.

17. The display device of claim 14, wherein the adhesive is disposed only between its corresponding chiplet and the display substrate.

18. The display device of claim 1, wherein the display optical element is an electroluminescent emitter or liquid-crystal light modulator.

19. The display device of claim 1, wherein the display optical element is an organic light-emitting diode.

20. The display device of claim 1, wherein the display substrate is adapted to transport light carrying second pixel information at a second selected control wavelength, and has an optical power attenuation along the long dimension of less than 20 dB at the second selected control wavelength; the chiplet is adapted to receive the transported light at the second selected control wavelength and further includes a second photosensor responsive to light from the optical waveguide at the second selected control wavelength for providing the second pixel information; and the selection circuit is further responsive to the second pixel information for providing the control signal; and further including a second optical transmitter for transmitting the second pixel information as light at the second selected control wavelength into the optical waveguide, wherein the second optical transmitter transmits light in response to the second pixel information provided by the controller, and wherein the transmitted light is transported by the optical waveguide to the second photosensor.

* * * * *